United States Patent [19]
Neelen

[11] 3,813,881
[45] June 4, 1974

[54] HOT-GAS ENGINE

[75] Inventor: Gregorius Theodorus Maria Neelen, Dordrecht, Netherlands

[73] Assignee: U.S. Philips Corporation, New York, N.Y.

[22] Filed: Sept. 11, 1972

[21] Appl. No.: 288,108

[30] Foreign Application Priority Data
Sept. 17, 1971 Netherlands.................... 7112770

[52] U.S. Cl. ................................................. 60/521
[51] Int. Cl. ............................................ F03q 7/06
[58] Field of Search.......... 60/24, 39.01 T; 415/122; 423/119 CB

[56] References Cited
UNITED STATES PATENTS

| | | |
|---|---|---|
| 2,306,277 | 12/1942 | Oswald ..................... 123/119 CF X |
| 2,327,202 | 8/1943 | McCollum ..................... 123/119 CB |
| 2,990,681 | 7/1961 | Wales ..................................... 60/24 |
| 3,469,393 | 9/1969 | Tryhorn ........................ 123/119 CB |

Primary Examiner—Edgar W. Geoghegan
Assistant Examiner—H. Burks, Sr.
Attorney, Agent, or Firm—Frank R. Trifari

[57] ABSTRACT

A hot-gas engine having a burner device which is provided with a fuel supply and a fan which is coupled to the engine shaft for supplying air of combustion, the supply of air of said fan being controllable in accordance with the average pressure in the working space of the engine, a small auxiliary fan having a small pressure increase and a large volume flow being arranged in series with the main fan and being driven with a constant number of revolutions.

3 Claims, 2 Drawing Figures

HOT-GAS ENGINE

BACKGROUND OF THE INVENTION

The invention relates to a hot-gas engine which comprises a space of variable volume and higher average temperature which communicates with a space of likewise variable volume and lower average temperature, a heater, a regenerator and a cooler being present in the communication between the said two spaces, the engine furthermore comprising a burner device for supplying thermal energy to the heater, said burner device comprising a fuel supply as well as a fan coupled to the engine shaft for supplying combustion air to the burner, the power supplied by the engine being variable by variation of the average pressure in the working space and the air supply of the fan being controllable in accordance with the average pressure in the working space.

A hot-gas engine of the type to which the present invention relates is known from Dutch Pat. application No. 6611690. In order to obtain an efficient combustion in the burner device in the different operating conditions of the engine, such as average pressure and number of revolutions, the fuel supply in this known engine is controlled in accordance with the temperature of the heater, the supplied quantity of combustion air being controlled by adjusting the transmission ratio of the coupling between the motor shaft and the fan shaft in accordance with the average pressure prevailing in the working space. In this comparatively simple manner, a given quantity of combustion air supplied by the fan is always associated with any power supplied by the engine. Since the supplied power is also in a direct relationship with the supplied fuel, a certain ratio fuel-air will thus always be obtained also.

It has been found, however, that with a constant engine couple, so constant average pressure but decreasing number of revolutions, the fan efficiency decreases linearly with the number of revolutions, for the transmission ratio between the engine shaft and the fan remains the same as a result of the constant average pressure. The need for air of the engine, however, decreases less rapidly than linearly so that at lower numbers of revolutions of the engine, the air excess in the burner decreases. The cause hereof is the constant losses which the Stirling engine also has at lower numbers of revolutions. It is the object of the invention to provide a solution to this detrimental effect occurring at the lower number of revolutions.

SUMMARY OF THE INVENTION

The hot-gas engine according to the invention is characterized in that a small auxiliary fan, with small pressure increase and large volume flow, is arranged in series with the first mentioned fan and can be driven with a constant number of revolutions.

Such a small auxiliary fan which runs with a constant number of revolutions will thus have a substantially constant influence on the totally supplied pressure of the combustion air for the preheater. So at high numbers of revolutions of the engine this influence will be comparatively small and be larger at lower numbers of revolutions so that just the effect in view is obtained and also at lower numbers of revolutions such a large air pressure is supplied to the inlet of the preheater that the desirable air excess is produced and the combustion can occur optimum in the whole range of numbers of revolutions of the engine. It has been found that the added auxiliary fan requires only little power so that electric drive can be considered. The auxiliary fan may be constructed as a radial or as an axial fan. Complicated controls of the combustion air-fan have thus become superfluous. The invention will be described in greater detail with reference to the drawings.

DESCRIPTION OF THE PREFERRED EMBODIMENT

Figure 1:
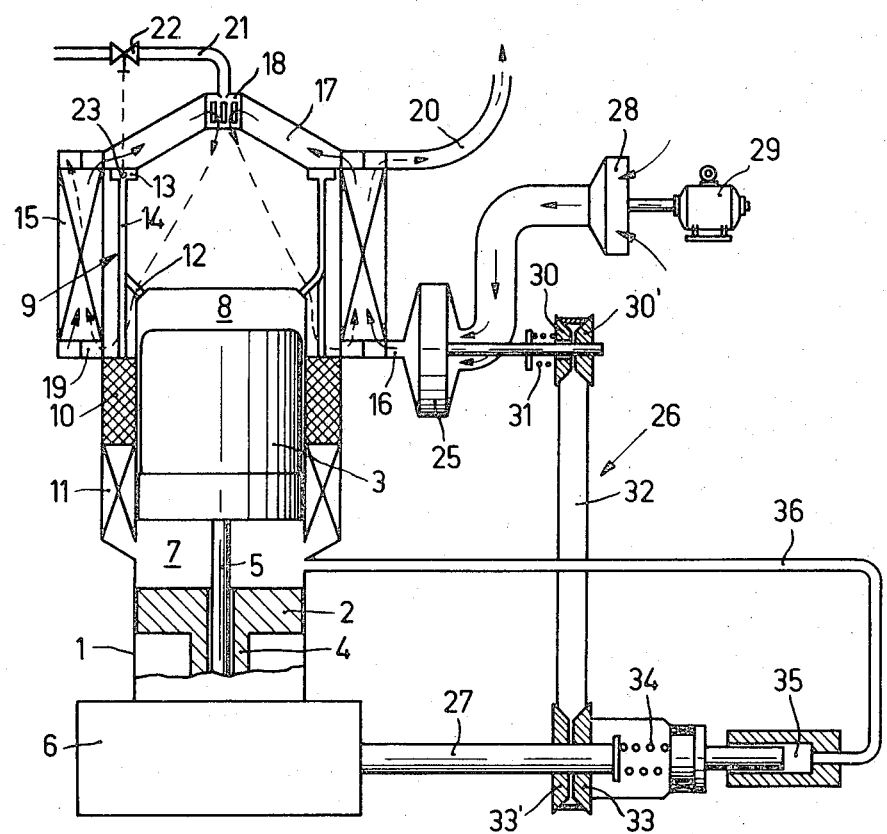
FIG. 1 shows diagrammatically and not to scale a hot-gas engine.

Reference numeral 1 in FIG. 1 denotes a cylinder in which a piston 2 and a displayer 3 are incorporated. The piston 2 and the displacer 3 are connected by means of a piston rod 4 and a displacer rod 5, respectively, to a driving mechanism which is not shown in the drawing and is present in the crank case 6 and which moves the piston and the displacer with a mutual phase difference. A compression space 7 is present between the piston 2 and the displacer 3, while above the displacer 3 an expansion space 8 is present, which spaces communicate with each other via a heater 9, a regenerator 10 and a cooler 11. The heater consists of a number of pipes 12 which communicate at one end with the expansion space 8 and at the other end with the angular duct 13 and a number of pipes 14 which communicate the angular duct 13 with the regenerator 10.

A preheater 15 which is shown diagrammatically is arranged around the heater 9. A large number of heat exchanging ducts are present in said preheater one set of which communicates at one end with an inlet 16 for the air of combustion and at the other end with a duct 17 which opens into the burner 18, while the other set of ducts communicates at one end with an exhaust 19 for combustion gases from the heater and at the other end with an outlet 20 for combustion gases.

Fuel can be supplied to the burner 18 via a duct 21, a control valve 22 being present in said duct and being controlled by a temperature-sensitive element 23 which measures the temperature of the heater.

Combustion air is supplied to the inlet 16 by a combustion air fan 25 which is coupled to the shaft 27 of the hot-gas engine via a variable transmission 26. A small auxiliary fan 28 is arranged in series with the combustion air fan 25. The auxiliary fan 28 is driven with a constant number of revolutions by an electric motor 29.

The variable transmission 26 is formed by the belt pulleys 30 and 30' of which the pulley 30 is movable on the fan shaft and is forced in the direction of the pulley 30' by spring 31, the belt 32 and the belt pulley 33 and 33' of which the pulley 33 is movable on the engine shaft and assumes a given position under the influence of the force supplied by spring 34 and the average working pressure which prevails in the space 35 because this communicates with the compression space 7 via duct 36. The operation of this transmission will not be further described here since it is explained in detail in Dutch Pat. application No. 6,611,690.

Figure 2:
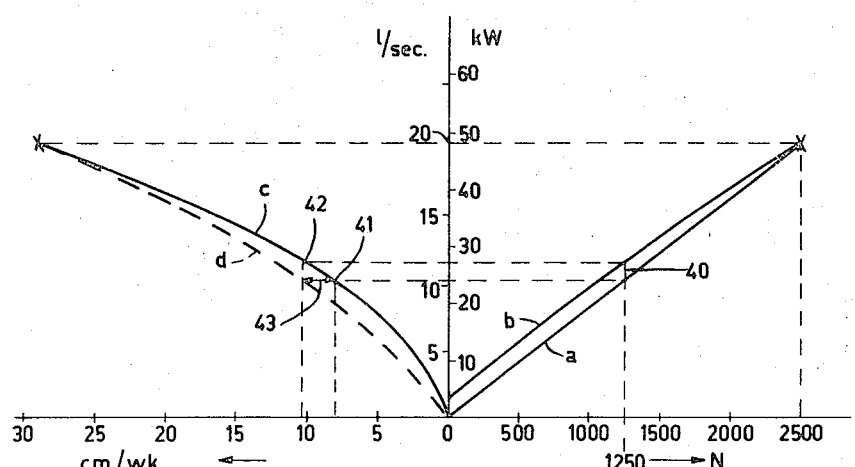
FIG. 2 shows a graph in which is plotted how in the engine shown in FIG. 1 the needs of air of combustion and quantity of air supplied by the combustion air fan vary with the number of revolutions of the engine.

It is shown in FIG. 2 how with a given average pressure in the working space the need for combustion air, with a given air excess, varies according to line $b$ as a function of the number of revolutions of the engine, while the quantity of air supplied by the fan 25 varies according to line $a$. From this figure it will be seen that at the lower numbers of revolutions the supplied quantity always lags behind stronger with respect to the demanded quantity.

In the left-hand part of FIG. 2 the line $c$ shows the resistance of the preheater in cm of water column with the prescribed quantity of combustion air.

It will be seen from FIG. 2 that at the full-load number of revolutions of the engine of 2,500 rpm the quantity of air supplied by the fan 25 just corresponds to the quantity required by the engine, which, as will be seen from the left-hand part of FIG. 2 involves that the pressure supplied by the fan is just large enough to overcome the resistance of the preheater. With a number of revolutions of the engine of 1,250 rpm it is found that the quantity of air supplied by the fan 25 is found to be too low by an amount corresponding to the distance 40. The pressure supplied by the fan 25 then is the pressure which corresponds to part 41 of line $c$ while in order to achieve the desirable quantity of air a pressure is required which corresponds to part 42 of line $c$. This means that the pressure supplied by the fan 25 is too low by an amount 43. Such a reasoning can be made for any number of revolutions in which the conclusion always is that the fan 25 supplies a pressure which is lower by an amount (corresponding to an amount 43) than is necessary for the desirable quantity of air. In this manner the line $d$ is obtained. It can be read for any quantity of air how much the pressure supplied by the fan 25 is too low and hence conversely how much pressure the fan 28 arranged in series with the fan 25 is to supply. It has been found that this pressure is only small and substantially equal to the amount 43 at 1,250 rpm over a large region. At higher numbers of revolutions the difference between the demanded pressure and the pressure supplied by the fan 25 decreases so that the fan 28 then need supply also a smaller amount. A fan 28 having such a characteristic is easy to manufacture. Some deviation occurs only in the region of the lowest numbers of revolutions because in that region the difference between the pressure supplied by the fan 25 and the demanded pressures again decreases, while the fan 25 in that region supplies more pressure than is necessary. However this presents no problems because it means that the excess of air in this region of the lowest numbers of revolutions of the engine then slightly increases. In this manner a hot-gas engine is obtained by a comparatively simple measure with an efficient combustion in all corcumstances.

Although the invention has been described with reference to a hot-gas engine in which the main fan is coupled to the engine shaft via a controllable transmission, it will be obvious that the invention may equally readily be applied to hot-gas engines in which the supply of air by the main fan is controlled differently in accordance with the pressure level in the engine. For example, a fan may be used having controllable guiding vanes.

What is claimed is:

1. In a hot-gas engine including a variable volume compression space filled with a working gas that experiences a variable average pressure, a heater, a burner for supplying thermal energy to the heater, and an output shaft, the improvement in combination therewith of air supply means for said burner comprising a main fan, first means coupling said shaft to said main fan for operating the fan at variable speed, second means responsive to said average pressure in the compression space for controlling said first means and correspondingly the fan speed, an auxiliary fan providing an air flow in series with said main fan air flow, and third means for operating said auxiliary fan at a constant speed.

2. Apparatus according to claim 1 wherein said auxiliary fan has large volume flow with small pressure increase characteristics.

3. Apparatus according to claim 1 wherein said hot-gas engine is a Stirling engine.

* * * * *